INVENTOR:
HANS KÜHNLEIN
ATTORNEYS

Sept. 20, 1966     H. KÜHNLEIN     3,273,630
FALLING FILM EVAPORATOR FOR CONCENTRATING ALKALINE LIQUORS
Filed Aug. 19, 1963     2 Sheets-Sheet 2

INVENTOR:
HANS KÜHNLEIN
BY: McGlew and Toren
ATTORNEYS

United States Patent Office 3,273,630
Patented Sept. 20, 1966

3,273,630
FALLING FILM EVAPORATOR FOR CONCENTRATING ALKALINE LIQUORS
Hans Kühnlein, Fullinsdorf, Basel Land, Switzerland, assignor to Hch. Bertrams Aktiengesellschaft, Basel, Switzerland
Filed Aug. 19, 1963, Ser. No. 302,846
Claims priority, application Switzerland, Aug. 20, 1962, 9,920/62, 9,921/62
5 Claims. (Cl. 159—6)

This invention generally relates to liquid concentration and is particularly directed to a process and apparatus for the concentration of alkaline liquors such as sodium hydroxide or potassium hydroxide containing liquids, hereinafter collectively referred to as "liquor."

Sodium hydroxide (NaOH) and potassium hydroxide (KOH) are obtained as by-products or residual products in many industrial processes in the form of aqueous solutions having an alkali metal hydroxide content of about 40 to 50%. These liquors are, of course, valuable and several processes and apparatus have been developed for the purpose of concentrating the liquors to obtain a substantially anhydrous melt of alkali metal hydroxide from the liquor. The alkali metal hydroxide melt is then usually crystallized into a suitable form such as flakes or beads. The evaporation of the water from the liquors is, however, a difficult task and many technical problems have to be overcome. This is so because highly concentrated alkaline liquors have boiling temperatures in excess of 400° C. and at such temperatures exert a strongly corrosive action. Present large-scale industrial plants for the concentration of such liquors customarily either employ cascade boilers or evaporators through which the liquid is passed, or the evaporation is performed in long tube vertical film-type evaporators wherein the liquor is passed upwardly through the tubes to form a film which climbs or rises along the walls of the tubes. Such plants are generally referred to as Badger plants.

Cascade evaporators are heated either directly by flue and combustion gases or indirectly by a suitable high temperature heat carrier. Generally, cascade evaporators have many advantages primarily because they have a relatively long life. This is so because the evaporator or boiler walls can be anodically protected and because the speed of the liquor through the plant is relatively slow. However, concentration according to the cascade evaporator principle also has several essential drawbacks. An important such drawback is that the evaporators have a large liquid volume which in turn requires a relatively long period for heating the liquor to the required temperature and moreover makes it difficult to shut down the operation. Further, relatively large heating surfaces are required because only limited heat transfer between the evaporator walls and the liquor is possible. With a view to operating cascade evaporators in an economical manner, several such evaporators have to be provided, which are connected to each other by heated conduits or lines. These conduits are oftentimes the source of operational difficulties because the concentrated liquor tends to crystallize therein.

In the so-called Badger plants wherein a liquor film climbs along the tube walls, it is generally possible to obtain the required end concentration by a one-time passage of the liquor through the tubes. However, in order to accomplish this goal, extremely long tubes of about 6 meter length and of a diameter of about 20 millimeters are required. Due to the required large concentration ratio in the tubes, exceedingly high vapor and liquid speeds are obtained which cause erosion of the tube material.

Also, other known arrangements for concentrating liquors have serious drawbacks as such arrangements generally have to be operated under high vacuum. Vacuum operation results in several drawbacks, such as danger of tube rupture, local corrosion, etc.

The present invention has as its primary object to overcome the disadvantages of the prior art arrangements for concentrating alkaline liquors and provides for a novel procedure and a novel device for accomplishing this aim.

Another object of this invention is to provide a procedure for concentrating alkaline liquors which retains the advantages of the prior art procedures but obviates the disadvantages thereof.

Generally, it is an object of this invention to improve on the art of alkaline liquor concentration as presently practiced.

Briefly, and in accordance with the inventive procedure, alkaline liquor is concentrated by slowly conducting a continuous tubular, e.g. cylindrical, film of the liquor along a constrained path in a downward direction and under normal pressure conditions. The external face of said film is heated in counter-current by a suitable heating medium whereby downwardly flowing vapor is produced in the space defined by said film. At least in the upper portion of the tubular film, forces are intentionally created within the space defined by the film, which forces are directed toward the film for stabilizing the latter.

In a practical embodiment, the descending tubular film is produced by making the liquor flow along the inner wall of a tube, the outer wall of the tube being heated in counter-current by a rising heating medium. The stabilizing forces which are created within the space defined by the tube-surrounded film may be in the form of mechanical elements such as a helical screw, the action of which will be explained further below.

As the film layer is relatively thin, the film-like spreading or expansion of the liquor to be concentrated results in excellent heat transfer. By contrast to the prior art rising film procedure, the inventive descending film procedure permits the employment of tubes of relatively large diameter. This in turn makes it possible to operate with relatively slow steam and liquor speeds which, of course, significantly reduces the tendency of the tubes to erosion. In addition to excellent heat transmission and transfer values, the total temperature drop during the travel of the film through the tube may be relatively large. This is so because the tube is heated in counter-current by means of a suitable heating medium as, for example, a salt mixture solution of $NaNO_2$, $NaNO_3$ and $KNO_3$. Tests have established that in accordance with the new procedure, heat flux densities of more than 200,000 kcal./m.$^2$/h. may be obtained.

Due to the fact that NaOH and KOH in the usual concentration range of 40 to 65% have a tendency to foam, the high heat flux densities of the inventive procedure would cause the liquid film to break up unless counter measures are taken. The rupture of the film, in the absence of such counter measures, would be caused by liquid particles or droplets which would be dislodged from the inner heated tube surface and would be hurled or sprayed toward the interior of the tube. Such dislodged particles or droplets do not take part in the evaporation and therefore negatively affect the required final concentration. If the removal of liquid particles from the film flowing along the heated tube wall progresses, the entire evaporation effect is considerably decreased. With a view to counteracting this disadvantageous effect, stabilizing forces are created within the descending film cylinder which forces are directed toward the film. These forces cause a return of such dislodged liquid particles to the film structure.

The invention also provides for an arrangement for carrying out the inventive procedure. This arrangement comprises at least one tube through which the liquor film descends. The tube has an outer jacket for conveying a heating medium in counter-current to the descending film.

A mechanical element is arranged at a distance from the tube wall at least in the upper tube half, which element permits passage of the vapor without affecting the speed of the vapor motion and which element causes the recycling or return to the film of those liquid particles which have been expelled or hurled off from the film surface.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
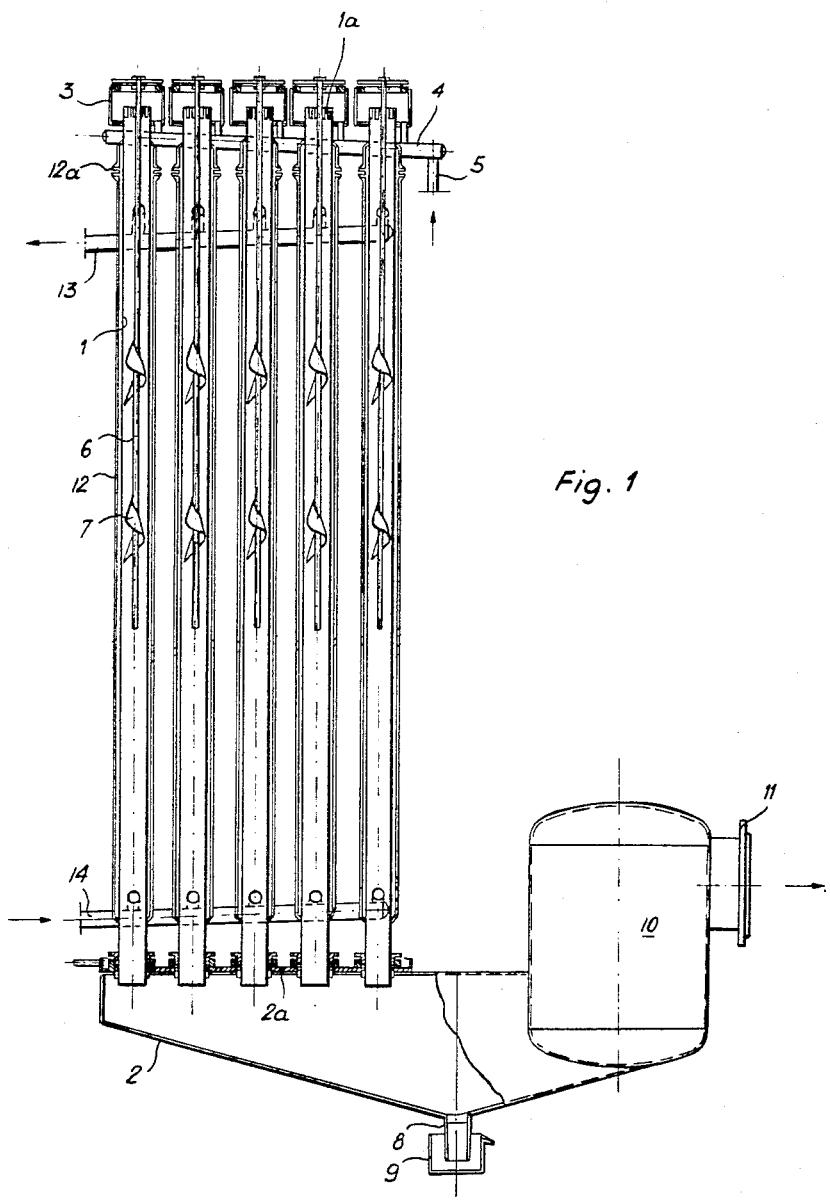
FIG. 1 is a vertical section through one embodiment of an inventive concentrating plant.
Figure 2:
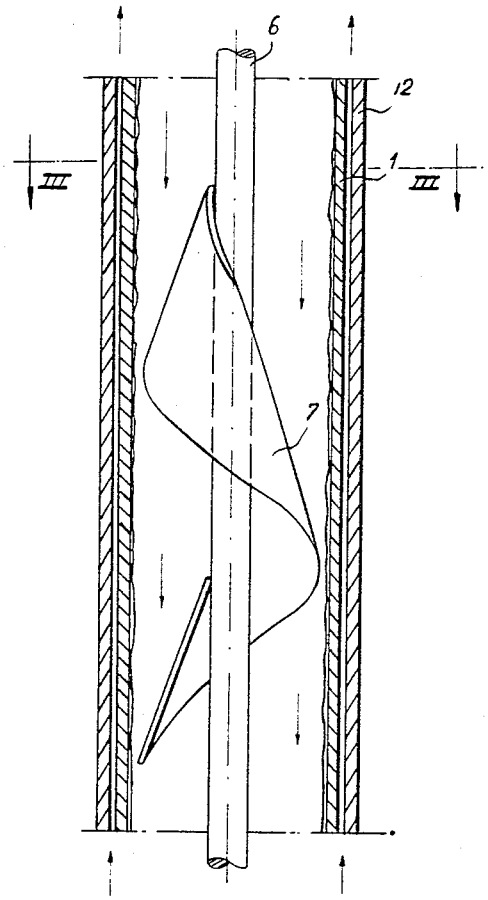
FIG. 2 shows on enlarged scale and in axial section a portion of one of the tubes of the plant.
Figure 3:
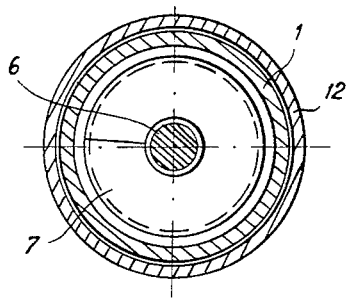
FIG. 3 is a cross-section along line III—III of FIG. 2.

Referring now to the drawings, it will be noted that the plant shown in FIG. 1 comprises five upright tubes 1 which are arranged in a row adjacent each other. The diameter of these tubes is about 80 to 100 mm. while the tube length is about 3 meters. The tubes 1 are open at the top and bottom. The lower end of each tube is anchored in the lid or cover 2a of a common collector tub 2 for collecting the liquor concentrate emanating from each tube. The upper end or extremity of each tube 1 is provided with peripheral slots 1a and extends through the bottom of an overflow tub 3. The overflow tubs 3, one being provided for each tube, are in communication with a distributor pipe 4, the latter in turn being connected to an alkali liquor supply line 5. The upper end of a circular rod 6 is secured in the cover of each of the overflow tubs 3. The rods 6, one being provided for each of the tubes 1, extend axially downwardly through the upper half of the tubes. In the embodiment shown, each of the rods 6 carries two axially spaced-apart metal elements 7. These elements 7 have the form of a slanted or oblique closed screw surface. The outer edge of these elements 7 is arranged at a distance from the inner wall of the respective tube 1 so that this edge, during operation of the plant, does not touch but is very close to the liquor film which flows downwardly along the inner wall of the respective tube. It will be realized that more than two elements 7 can be employed and that these elements may be distributed over more than the upper tube half. Experiments have shown that particularly advantageous results are obtained if the screw surface of the elements has a pitch of about 150 mm. and an angular inclination relative to the tube axis of about 20°. In the concentration of NaOH liquors, an excellent effect was obtained with two such elements at a distance of about 900 and 1500 mm., respectively, measured from the upper tube edge.

The outlet 8 of the collector tub 2 dips into an overflow receptacle 9. Due to the concentrate which collects in the receptacle 9, the system formed by the tub 2 and the tubes 1 is sealed with regard to atmospheric air during operation of the plant. The collector tub 2 is connected with a centrifugal separator 10. Vapor formed during operation of the plant exits after purification in the member 10 through the member 11 seen in FIG. 1. Each of the tubes 1 is moreover surrounded by a jacket 12 which is only slightly spaced from the exterior wall of each tube. The jackets 12 are provided in their upper portions with a compensator or differential tubular expansion take up means 12a which compensates for or takes up stresses which occur due to expansion. The annular space between the outer wall of the tubes 1 and the jackets 12 thus form a flow passage for heating medium. The upper extremity of the jackets 12 is moreover connected to a common heating medium discharge line 13 while the lower end of the jackets 12 are connected to a common heating medium supply line 14. Due to this arrangement, each of the tubes may be individually heated by heating medium flowing through the narrow annular gap between the pipes 1 and jackets 12.

During operation of the inventive arrangement, the overflow tubs 3 are supplied with liquor through the supply pipe 5 and the distributor pipe 4. The liquor enters the respective tubes 1 through the slotted apertures 1a in the upper end of the tubes and flows then along the inner wall of the respective tube 1 in the form of a continuous cylindrical film in a downward direction. At the same time, heating medium is introduced through the supply line 14 to rise in the annular gap between tubes 1 and jackets 12. This heating medium may have an inlet temperature of about 480° C. and may consist of a liquid salt mixture. The heating medium is passed through the gap between the tubes 1 and jackets 12 with relatively large speed and is discharged through the discharge line 13. The heated descending liquor film which flows downwardly along the inner wall of the respective tube 1 is thereby concentrated and evaporated water forms vapors in the interior of the tubes which vapors move axially downwardly through the tubes. As previously mentioned, liquor solutions of the kind with which this invention is concerned have a tendency to foam during heating. Due to the progressing evaporation of the water on the one hand, and by dislodging of liquor particles from the tube walls on the other hand, the continuity of the film may be disturbed or impaired. The built-in screw elements 7, however, counteract this tendency and make sure that any dislodged liquor particles which are moved downwardly by the vapors in the interior of the tubes strike the inclined surface of the screw elements and are again urged back toward the interior tube walls. Due to the thinness of these elements 7 and their relatively large pitch, the cross-section in the tube is hardly affected so that no significant obstruction to the movement of the vapor and no appreciable acceleration of the vapor flow and thus no increased turbulence take place. The concentrated liquor flows from the tube ends into the collector tub 2 and through the outlet 8 into the overflow receptacle 9 from where the concentrated liquor is discharged from the plant. The vapors, by contrast, are conveyed from the tub 2 into the separator 10 where the vapors are liberated from any remaining liquor droplets. The vapors are then discharged from the plant through the outlet 11.

As seen from the drawing, each individual evaporator unit 1, 3, 12 may be individually assembled and built into the plant and thus can be replaced at will without that the entire plant has to be disassembled. The arrangement of individual tubes 1 having their own heating jackets with built-in compensating or expansion take up means for compensating for expansion stresses assures that the individual tubes are completely free from any stresses due to expansion.

Due to the particularly excellent heat transfer conditions which prevail in the inventive arrangement, the concentration may be effected under atmospheric pressure. Liquor concentrations of 99.9% can easily be obtained. The heat exchange surface which is made of expensive corrosion-resistant material is only half as large as the corresponding surface in, for example, a Badger evaporator, and is only about one-seventh of that of a cascade plant.

Experiments have shown that an output of five tons per 24 hours of 100% NaOH can be obtained per tube.

A very decisive advantage of the inventive arrangement resides in the fact that the content of concentrated liquor in the tubes is only a few liters in the entire plant. The production of the plant can therefore be adapted within a few seconds to the capacity of the discharge device for the NaOH or KOH to be crystallized. Throttling of the exit of the melt from the overflow receptacle 9 to a zero value can be accomplished within about five seconds. For these reasons, it is possible to eliminate the previously used storage containers for highly concentrated liquor. Danger of crystallization in the conduits and storage reservoirs is removed and less heat energy is required than in the prior art arrangements.

In plants which produce exclusively flakes from concentrated liquor, it is possible to operate a device of the indicated kind in synchronous manner with each flake making machine, that is, only that amount of liquor is concentrated which is directly taken over by the flake making machine.

The inventive liquor concentration plant requires only 25% of the space required by prior art arrangements with the same output. Due to the fact that operation is effected at ordinary atmospheric pressure, any barometer controlled discharge system for a highly concentrated liquor is eliminated so that the height of the plant need not be raised by two floors as, for example, in the Badger type evaporators.

While a specific embodiment of the invention has been shown and described in detail to illustrate the application of the inventive principles, it will be understood that this invention may be embodied otherwise without departing from such principles.

What is claimed is:

1. Apparatus for concentrating alkaline liquor, which comprises at least one upright tube, means for introducing alkaline liquor near the top of said tube for forming a continuous liquor film descending along the interior wall of said tube, heating means for heating the exterior wall of said tube, means for withdrawing concentrated liquor from the lower end of said tube and mechanical obstructing means arranged within the interior of said tube and spaced from said film for obstructing liquor particles entering the space defined by said liquor film and for conducting said particles back to said film, said obstructing means comprising at least one screw member mounted on rod means extending within said tube, said screw member having a slanted surface, the pitch of said screw member being about 150 mm. while the inclination of the slanted surface of the screw is about 20° relative to the axis of the tube.

2. Apparatus for concentrating alkaline liquor which comprises a plurality of upright tubes, means for introducing alkaline liquor near the top of each tube for forming a continuous liquor film descending the interior wall of each tube, heating means for heating the exterior wall of each tube in counter-current to the descent of said film, means for withdrawing concentrated liquor from the lower end of each tube, mechanical obstructing means located within at least the upper region of each tube and being spaced from the interior wall thereof for obstructing liquid particles dislodged from said film and for returning such particles toward said tube, said means for withdrawing concentrated liquor including a collector tub common for all tubes, said tub having a cover, means provided for detachably mounting all of said tubes in said cover, said heating means comprising a plurality of heating jackets, a corresponding one surrounding each of said tubes with clearance, all of said heating jackets being connected to a common heating medium supply line near the lower end of said jackets, while all of said jackets are connected to a common discharge conduit near the top of said jackets and separator means connected to said collector tub for separating liquid particles from vapor discharged from said tubes.

3. Apparatus for concentrating alkaline liquor, which comprises a plurality of upright tubes, means for introducing alkaline liquor near the top of each tube for forming a continuous liquor film descending the interior wall of each tube, heating means for heating the exterior wall of each tube in counter-current to the descent of said film, means for withdrawing concentrated liquor from the lower end of each tube, and mechanical obstructing means located within at least the upper region of each tube and being spaced from the interior wall thereof for obstructing liquid particles dislodged from said film and for returning such particles toward said tube, said liquor introducing means including an overflow tube for each tube and connected to a liquor supply pipe, the upper end of each tube passing through the bottom of the associated overflow tub.

4. Apparatus as claimed in claim 3, wherein each overflow tub has a cover, said obstructing means including a rod depending from said cover and into the associated tube, said rod having fixed thereto at least one screw-like element extending within the tube spaced from the interior wall thereof.

5. Apparatus for concentrating alkaline liquor, which comprises a plurality of upright tubes, means for introducing alkaline liquor near the top of each tube for forming a continuous liquor film descending the interior wall of each tube, heating means for heating the exterior wall of each tube in counter-current to the descent of said film, means for withdrawing concentrated liquor from the lower end of each tube, and mechanical obstructing means located within at least the upper region of each tube and being spaced from the interior wall thereof for obstructing liquid particles dislodged from said film and for returning such particles toward said tube, said means for withdrawing concentrated liquor including a collector tube common for all tubes, said tub having a cover, means being provided for detachably mounting all of said tubes in said cover, said collector tub having an outlet pipe and said outlet pipe projecting into an overflow container for sealing said tubes and said collector tub against ambient atmosphere.

References Cited by the Examiner

UNITED STATES PATENTS

| 166,180 | 8/1875 | Bailey | 138—38 |
| 191,747 | 6/1877 | Barrett | 138—148 |
| 1,323,013 | 11/1919 | Christie | 62—310 |
| 2,432,136 | 12/1947 | Bertetti | 159—13 X |
| 2,519,618 | 8/1950 | Wilson et al. | 159—13 X |
| 2,562,495 | 7/1951 | Hulme | 159—49 |
| 2,580,646 | 1/1952 | Belden | 202—154 |
| 2,758,061 | 8/1956 | Geller | 208—106 |
| 2,768,813 | 10/1956 | Boyer | 159—27 X |
| 2,838,107 | 6/1958 | Bridges et al. | 159—6 |

FOREIGN PATENTS

| 631,380 | 12/1927 | France. |
| 213,263 | 5/1908 | Germany. |
| 1,114,784 | 10/1961 | Germany. |
| 3,118 | 1895 | Great Britain. |
| 172,310 | 4/1922 | Great Britain. |
| 942,846 | 11/1963 | Great Britain. |

NORMAN YUDKOFF, *Primary Examiner.*

J. SOFER, *Assistant Examiner.*